(12) United States Patent
Cho et al.

(10) Patent No.: US 8,803,947 B2
(45) Date of Patent: Aug. 12, 2014

(54) APPARATUS AND METHOD FOR GENERATING EXTRAPOLATED VIEW

(75) Inventors: Yang Ho Cho, Hwaseong-si (KR); Ho Young Lee, Suwon-si (KR); Chang Yeong Kim, Seoul (KR); Du Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 346 days.

(21) Appl. No.: 13/154,947

(22) Filed: Jun. 7, 2011

(65) Prior Publication Data

US 2012/0033038 A1    Feb. 9, 2012

(30) Foreign Application Priority Data

Aug. 3, 2010  (KR) .................. 10-2010-0074910

(51) Int. Cl.
*H04N 13/00*    (2006.01)
(52) U.S. Cl.
USPC .............................. 348/43; 345/419; 388/232
(58) Field of Classification Search
None
See application file for complete search history.

(56) References Cited

U.S. PATENT DOCUMENTS

| | | | |
|---|---|---|---|
| 5,710,875 A | 1/1998 | Harashima et al. | |
| 6,031,538 A * | 2/2000 | Chupeau et al. | 345/419 |
| 6,268,918 B1 * | 7/2001 | Tanabe et al. | 356/602 |
| 2004/0252230 A1 * | 12/2004 | Winder | 348/402.1 |
| 2005/0007487 A1 * | 1/2005 | Miyoshi et al. | 348/362 |
| 2005/0021625 A1 * | 1/2005 | Fujimura et al. | 709/204 |
| 2007/0154070 A1 * | 7/2007 | Kondo et al. | 382/107 |
| 2007/0285554 A1 * | 12/2007 | Givon | 348/340 |
| 2008/0007700 A1 * | 1/2008 | vanBaar et al. | 353/94 |
| 2008/0181515 A1 * | 7/2008 | Kondo | 382/232 |
| 2009/0268820 A1 * | 10/2009 | Nishida | 375/240.16 |
| 2010/0014781 A1 * | 1/2010 | Liu et al. | 382/285 |
| 2010/0091092 A1 * | 4/2010 | Jeong et al. | 348/43 |

FOREIGN PATENT DOCUMENTS

| | | |
|---|---|---|
| KR | 10-0335617 | 4/2002 |
| KR | 10-2003-0040920 | 5/2003 |
| KR | 10-2003-0076904 | 9/2003 |
| KR | 10-2006-0019994 | 3/2006 |
| KR | 10-2006-0133764 | 12/2006 |
| KR | 10-2008-0000149 | 1/2008 |
| KR | 10-2008-0059883 | 7/2008 |
| KR | 10-2009-0068980 | 6/2009 |
| KR | 10-2009-0107748 | 10/2009 |
| KR | 10-2010-0019927 | 2/2010 |
| KR | 10-2010-0040593 | 4/2010 |
| WO | 96/07162 | 3/1996 |

* cited by examiner

*Primary Examiner* — Dave Czekaj
*Assistant Examiner* — MD Haque
(74) *Attorney, Agent, or Firm* — Staas & Halsey LLP

(57) ABSTRACT

A view extrapolation apparatus and a view extrapolation method to generate images at a plurality of virtual points uses a relatively small number of input images. The view extrapolation apparatus and the view extrapolation method output a view at a reference point, the view at the reference point being formed of frames generated chronologically, integrate a plurality of successive frames of the view at the reference point to generate an integrated frame, and generate an extrapolated view at a virtual point using the integrated frame.

31 Claims, 11 Drawing Sheets

APPARATUS AND METHOD FOR GENERATING EXTRAPOLATED VIEW

CROSS-REFERENCE TO RELATED APPLICATIONS

This application claims the priority benefit of Korean Patent Application No. 10-2010-0074910, filed on Aug. 3, 2010, in the Korean Intellectual Property Office, the disclosure of which is incorporated herein by reference.

BACKGROUND

1. Field

Example embodiments relate to an apparatus and a method for providing an extrapolated view at a point outside a photographed point.

2. Description of the Related Art

A three-dimensional (3D) image apparatus photographs a subject at two or more points to generate input views at the respective points.

An input view is formed by a sequence of frames. That is, the input view is formed by a predetermined number of frames output per unit time, for example 30 frames per second (FPS).

Generally, a frame is a 3D image having color information and depth information about each of pixels forming the frame. The depth information represents a distance between a photographed point and an object or a background corresponding to the pixels.

The color information about the pixels may be a binary representation to express color, for example, red, green, and blue (RGB).

The depth information about the pixels may be a binary representation to represent a value, for example, an integer number or a floating point, for a distance.

The 3D image apparatus may need to provide images at different points from the points of the input views to a user. Thus, the 3D image apparatus may generate an output view at a different point from the point of the input views based on the input views.

View interpolation denotes a process of generating an output view at a virtual point between the points of the input views. View interpolation may generate an output view image with reference to adjacent input view images at both sides of the virtual point. An output view generated by view interpolation is referred to as an interpolated view.

View extrapolation denotes a process of generating an output view at a point outside the points of the input views. That is, view extrapolation generates an output view at a left point from a point of a leftmost input view or generates an output view at a right point from a point of a rightmost input view. An output view generated by view extrapolation is referred to as an extrapolated view.

An interpolated view and an extrapolated view are also formed of a sequence of frames. A frame of an interpolated view or an extrapolated view is generally a 2D (two-dimensional) image.

SUMMARY

The foregoing and/or other aspects are achieved by providing an image apparatus including an input view generation unit to output a view at a reference point, the view at the reference point being formed of frames generated chronologically, an integrated frame generation unit to integrate a plurality of successive frames of the output view at the reference point and to generate an integrated frame, and an extrapolated view generation unit to generate an extrapolated view at a virtual point using the integrated frame.

The image apparatus may obtain a plurality of views at a plurality of points, and the input view generation unit may output a view obtained at a leftmost or rightmost point among the plurality of points.

The image apparatus may further include a motion estimation unit to generate chronological motion information about the plurality of frames, wherein the integrated frame generation unit may generate the integrated frame based on the motion information.

The motion estimation unit may generate a global motion vector based on chronological motion of an entire region of the plurality of frames, and the motion information may include the global motion vector.

The motion estimation unit may refine the global motion vector based on a chronological change of a local region in the plurality of frames.

The motion estimation unit may generate a local motion vector based on chronological motion of an object region in the plurality of frames, and the motion information may include the local motion vector.

The image apparatus may further include a seamless frame merging unit to decrease discordance in a boundary spot in the integrated frame, wherein the discordance may be generated due to different properties between frames forming the boundary spot among the plurality of frames.

The integrated frame generation unit may generate the integrated frame by separating foreground regions and background regions of the plurality of frames using depth information about the plurality of frames and by integrating the background regions.

The integrated frame generation unit may compensate for an object boundary hole region using the integrated background regions.

The integrated frame generation unit may generate the integrated frame using color information and depth information about the plurality of frames, and the integrated frame may be resized in a horizontal direction.

The extrapolated view generation unit may generate the extrapolated view by repositioning a pixel in the integrated frame using color information and depth information about the integrated frame.

The extrapolated view generation unit may generate the extrapolated view by repositioning the pixel using a weighting proportionate to a distance between the reference point and the virtual point.

According to another aspect of example embodiments, a method of generating an extrapolated view includes generating an input view to output a view at a reference point, the view at the reference point being formed of frames generated chronologically, integrating a plurality of successive frames of the output view at the reference point and generating an integrated frame, and generating an extrapolated view at a virtual point using the integrated frame.

The method may further include estimating motion to generate chronological motion information about the plurality of frames, wherein the generating of the integrated frame may generate the integrated frame based on the motion information.

The estimating of the motion may include generating a global motion vector based on chronological motion of an entire region of the plurality of frames, and the motion information may include the global motion vector.

The method may further include seamless frame merging to decrease discordance in a boundary spot in the integrated frame, wherein the discordance may be generated due to different properties between frames forming the boundary spot among the plurality of frames.

The generating of the integrated frame may include separating foreground regions and background regions of the plurality of frames using depth information about the plurality of frames, and integrating the background regions to generate the integrated background regions resized in a horizontal direction.

The generating of the integrated frame may further include compensating for an object boundary hole region using the integrated background regions.

The generating of the extrapolated view may include warping an image by repositioning a pixel in the integrated frame using a weighting proportionate to a distance between the reference point and the virtual point, color information about the integrated frame, and depth information about the integrated frame.

According to a further aspect of the present embodiments, an image apparatus includes a controller including an input view generation unit to output a view at a reference point, the view at the reference point comprising frames generated chronologically, an integrated frame generation unit to integrate successive frames of the output view at the reference point based upon a characteristic of each of the successive frames, and to generate an integrated frame, and an extrapolated view generation unit to generate an extrapolated view at a virtual point using the integrated frame.

According to yet another aspect of the present embodiments, a method of generating an extrapolated view includes generating, by a controller, an input view to output a view at a reference point, the view at the reference point comprising frames generated chronologically, integrating, by the controller, a plurality of successive frames of the output view at the reference point based upon a characteristic of each of the successive frames, and generating an integrated frame, and generating, by the controller, an extrapolated view at a virtual point using the integrated frame.

In the foregoing apparatus and/or method, the characteristic may include motion, background, color, and/or depth.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
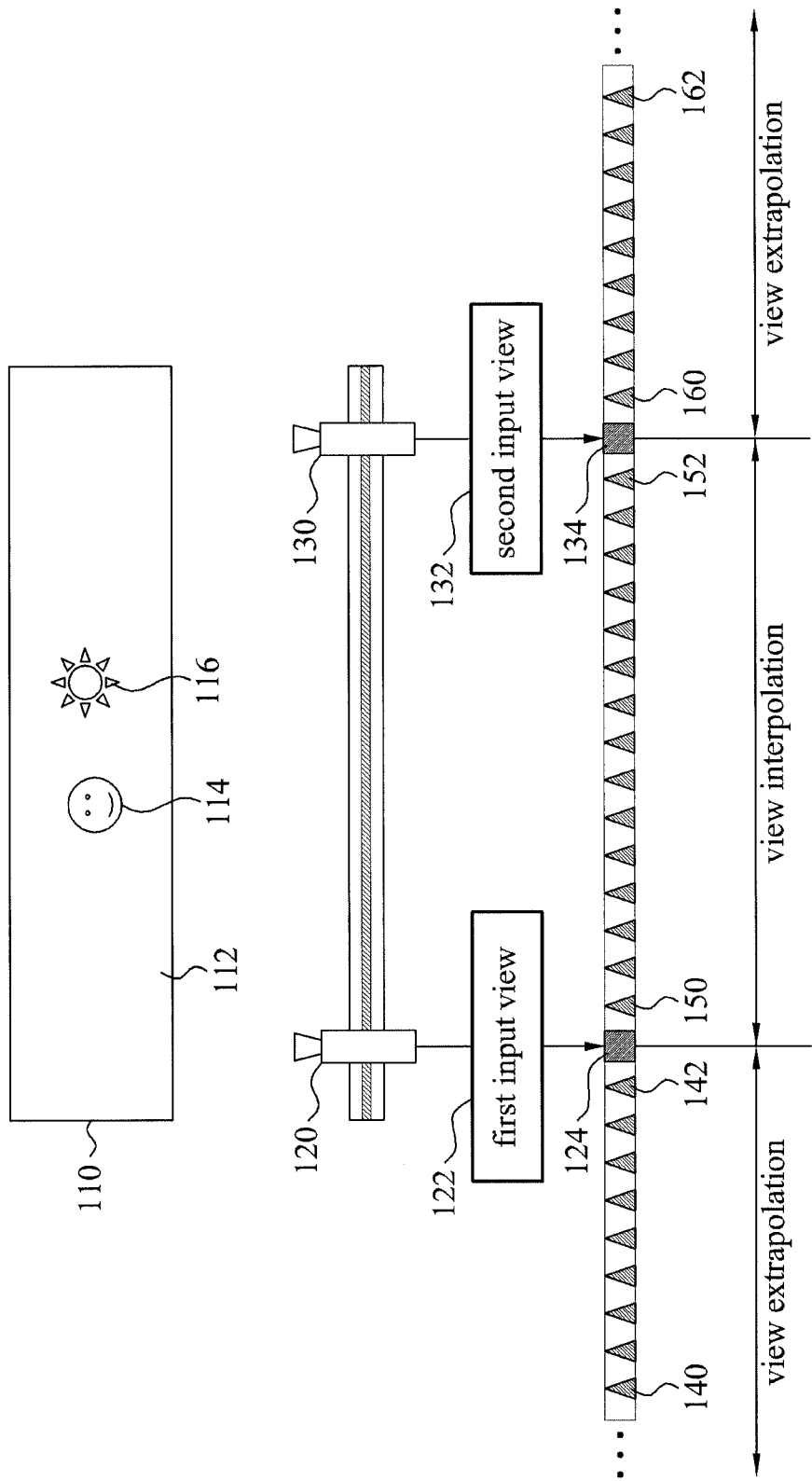
FIG. 1 illustrates a method of generating a view based on two input views according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a method of generating a view based on two input views according to example embodiments.

In the present embodiments, a subject 110 to be photographed includes a foreground and a background 112. The foreground includes a first object 114 and a second object 116.

Depending on an observer's viewpoint, a relative position of the first object 114 and the second object 116 to the background 112 may change between a left side or a right side.

For example, a first input device 120, such as a camera, photographs the subject 110 at a first point, and a second input device 130 photographs the subject 110 at a second point.

Through photographing by a camera, for example, the first input device 120 generates a first input view 122, and the second input device 130 generates a second input view 132. That is, the first input view 122 provides an image when a viewer sees the subject 110 from the first point, and the second input view 132 provides an image when the viewer sees the subject 110 from the second point.

The first input view 122 and the second input view 132 include a sequence of frames. A frame 124 of the first input view 122 at a point in time t and a frame 134 of the second input view 132 at the point in time t are shown in rectangles.

To provide an image of the subject 110 seen by the viewer from a virtual point other than the first point and the second point, view extrapolation or view interpolation is performed using frames provided by the first view 122 and/or the second view 132.

An interpolated view and an extrapolated view also include a sequence of frames.

In FIG. 1, triangles 140, 142, 150, 152, 160, and 162 represent frames of an interpolated view and frames of an extrapolated view at points where the respective triangles are positioned. The frames are frames at the point in time t.

A leftmost input view, which is a view outside of (or, in FIG. 1, left of) a point of the first input view 122, is an extrapolated view. Further, a rightmost input view, which is a view outside of (or, in FIG. 1, right of) a point of the second input view 132, is an extrapolated view. That is, frames 140, 142, 160, and 162 are frames of the extrapolated views at the point in time t. Frames 140, 142, 160, and 162 are extrapolated views since frames 140, 142, 160, and 162 are outside of (either to the left or to the right of) the respective input views 122 and 132. An outermost input view is a leftmost input view and/or a rightmost input view.

A view at a point between the points of the input views 122 and 132 is an interpolated view. That is, frames 150 and 152 are frames of the interpolated views at the point in time t.

Figure 2:
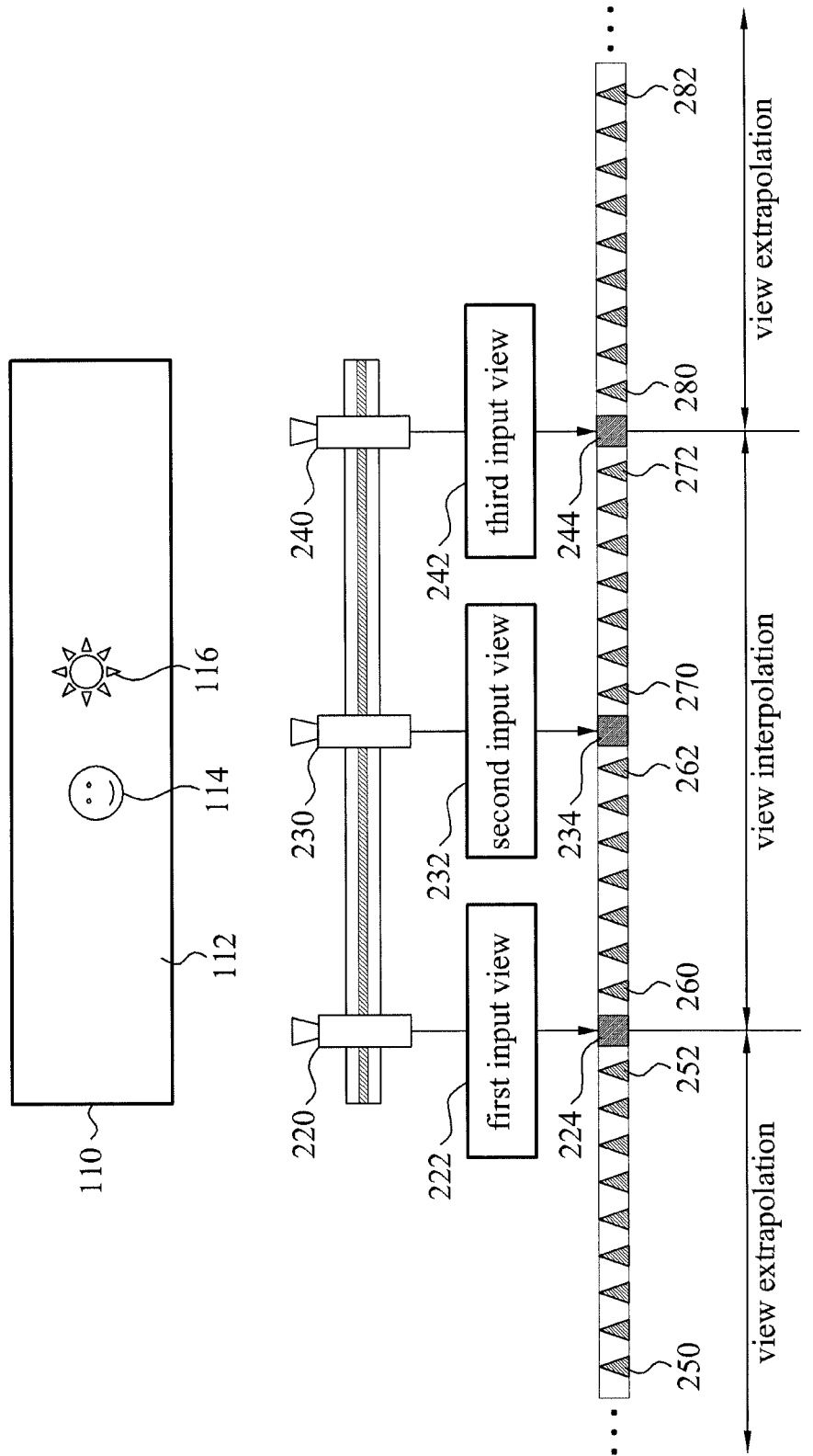
FIG. 2 illustrates a method of generating a view based on three input views according to example embodiments.

FIG. 2 illustrates a method of generating a view based on three input views according to example embodiments.

Input devices 220, 230, and 240 photograph a subject 110 at different points to generate input views 222, 232, and 242, respectively.

To provide an image of the subject 110 seen by a viewer from a different point from the points of the input devices 220, 230, and 240, view extrapolation or view interpolation is performed using frames provided by the views 222, 232, and 242 generated by the input devices 220, 230, and 240.

In FIG. 2, rectangles 224, 234, and 244 represent frames of the input views.

In FIG. 2, triangles 250, 252, 260, 262, 270, 272, 280, and 282 represent frames of an interpolated view and frames of an extrapolated view at points where the respective triangles are positioned.

A view outside of (in FIG. 2, left of) a point of a leftmost input view 222 is an extrapolated view. Further, a view outside of (in FIG. 2, right of) a point of a rightmost input view 242 is an extrapolated view. Frames 250, 252, 280, and 282 are frames of the extrapolated views at a point in time t.

A view at a point between points of the input views 222, 232, and 242 is an interpolated view. Frames 260, 262, 270, and 272 are frames of the interpolated view at the point in time t.

The interpolated view and the extrapolated views also include a sequence of frames.

As described above with reference to FIGS. 1 and 2, based on N input views, M output views at points of the N input views and at different points from the points may be generated.

Figure 3:
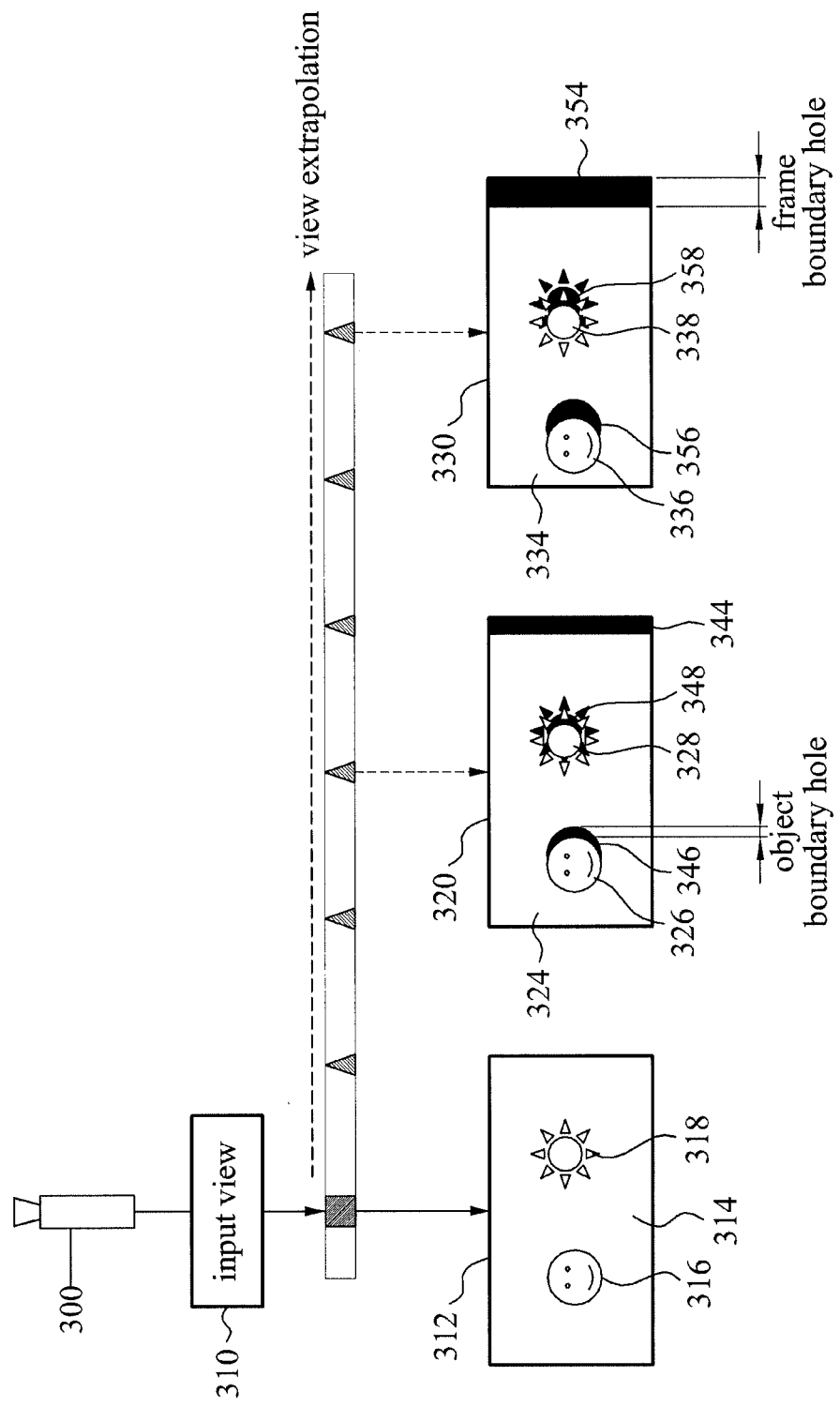
FIG. 3 illustrates a method of generating a frame of an extrapolated view according to example embodiments.

FIG. 3 illustrates a method of generating a frame of an extrapolated view according to example embodiments.

A sequence of frames is provided through an input view 310. FIG. 3 illustrates a frame 312 of the input view 310 at a point in time t.

Based on the input view 310, a first extrapolated view and a second extrapolated view are generated by view extrapolation at points to the right of (or outside of) a point of the input view 310.

A frame 320 of the first extrapolated view and a frame 330 of the second extrapolated view at the point in time t are generated using the frame 312 of the input view 310.

The input view 310 is obtained by photographing the subject 110 of FIG. 1 using an input device 300 (such as input devices 120, 130, 220, 230, 240 previously discussed), and the frame 312 of the input view 310 includes a background 314, a first object 316, and a second object 318.

The frame 320 of the first extrapolated view also includes a background 324, a first object 326, and a second object 328.

A point of the first extrapolated view is positioned right of the point of the input view 310. Thus, the background 324, the first object 326, and the second object 328 in the frame 320 of the first extrapolated view are positioned left of those in the frame 312 of the input frame 310.

An extent to which the background 324 is positioned left depends on a distance from the point of the input view 310 to the background 324 and depends on a distance between the point of the input view 310 and the point of the first extrapolated view.

As described above, since the entire background 324 is moved to the left, the frame 320 of the first extrapolated view has a frame boundary hole 344 which is not filled with the frame 312 of the input view 310.

The objects 326 and 328 forming a foreground are also moved as the background 324 is moved. Moreover, the objects 326 and 328 are moved further to the left than the background 324.

An extent to which the objects 326 and 328 are positioned further to the left than the background 324 depends on a distance from the point of the input view 310 to each of the objects 326 and 328 and depends on a distance between the point of the input view 310 and the point of the first extrapolated view.

The objects 326 and 328 are moved further to the left than the background 324, and thus the frame 320 of the first extrapolated view has object boundary holes 346 and 348 which are not filled with the frame 312 of the input view 310.

To generate an extrapolated view, a pixel is properly extrapolated in the frame boundary hole 354 and the object boundary holes 346 and 348.

The frame 330 of the second extrapolated view also has a frame boundary hole 354 and object boundary holes 356 and 358.

A point of the second extrapolated view is more distant from the point of the input view 310 than the point of the first extrapolated view. A background 334, a first object 336, and a second object 338 in the frame 330 of the second extrapolated view are positioned further to the left than the background 324, the first object 326, and the second object 328 in the frame 320 of the first extrapolated view.

The frame boundary hole 354 and the object boundary holes 356 and 358 in the frame 330 of the second extrapolated view are wider from side to side than the frame boundary hole 344 and the object boundary holes 346 and 348 in the frame 320 of the first extrapolated view.

Thus, more pixels are extrapolated in the frame boundary hole 354 and the object boundary holes 356 and 358 in the frame 330 of the secondary extrapolated view.

Figure 4:
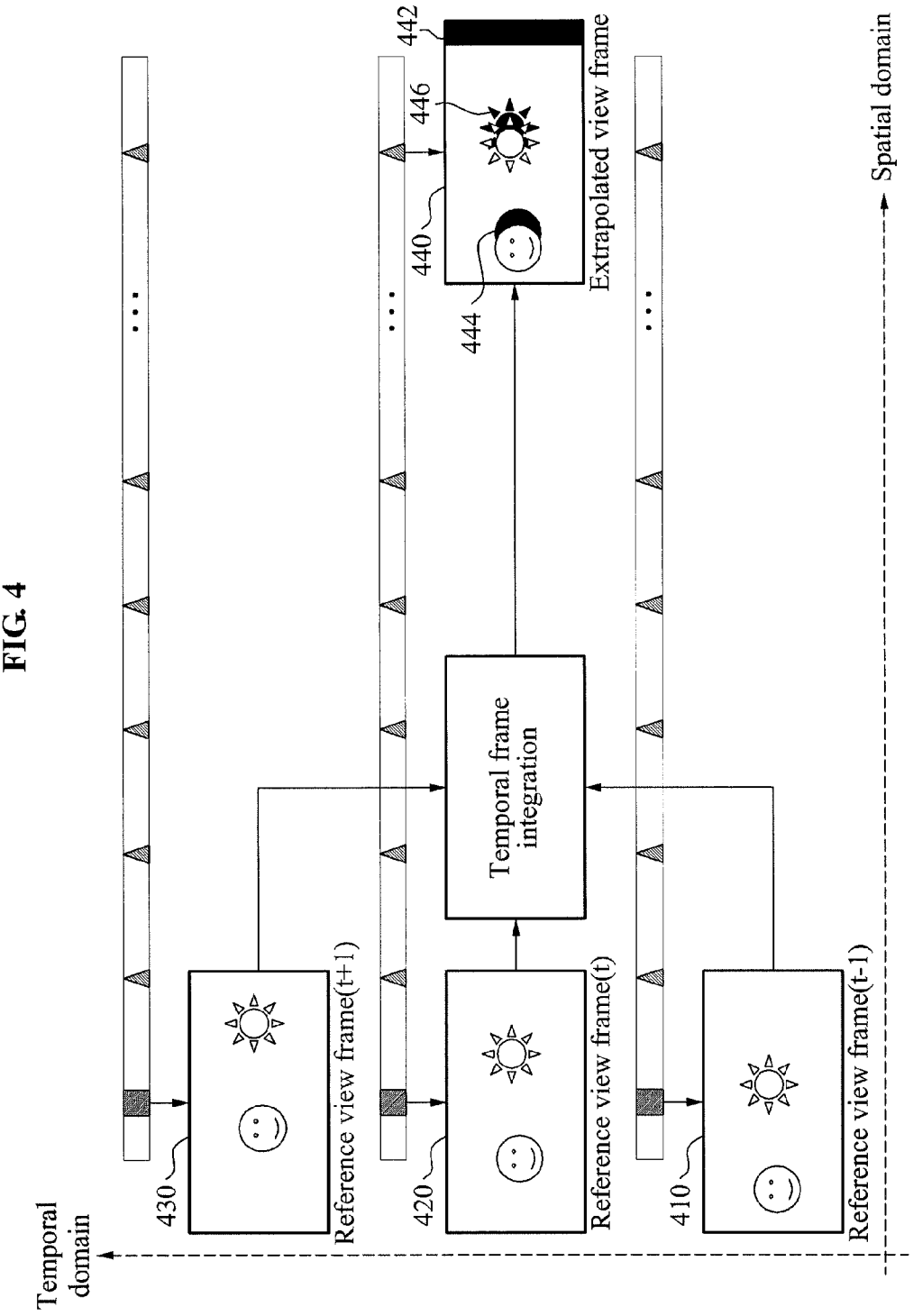
FIG. 4 illustrates a method of generating a frame of an extrapolated view using a plurality of frames of an input view according to example embodiments.

FIG. 4 illustrates a method of generating a frame of an extrapolated view using a plurality of frames of an input view according to example embodiments.

An input view used to generate a frame of an extrapolated view is referred to as a reference view.

The reference view may be an input view at an outermost point, such as an input view at a leftmost point or an input view at a rightmost point among a plurality of input views.

A plurality of extrapolated views may be distinguished based on a distance from the reference view. An x-axis representing a distance from the reference view to an extrapolated view is referred to as a spatial domain.

The reference view and the extrapolated view output a predetermined number of frames per unit time. A y-axis representing a temporal order of the output frames is referred to a temporal domain.

That is, the spatial domain may be a spatial axis representing a distance between points of views based on the same point in time. The temporal domain may be a time axis representing a temporal order of frames based on a unitary view.

When a frame 440 of an extrapolated view is generated using only a frame of a reference view 420 at a point in time t, a background hole region 442 and object hole regions 444 and 446 are generated in the frame 440 of the extrapolated view. The background hole region 442 corresponds to the frame boundary holes 344 and 354. The object hole regions 444 and 446 correspond to the object boundary holes 346, 348, 356 and 358.

So that pixels are properly extrapolated in the background hole region 442 and the object hole regions 444 and 446 to generate the adequate frame 440 of the extrapolated view, a previous frame of the reference view or a subsequent frame of the reference view is used in addition to the frame 420 of the reference view at the point in time t.

In the present embodiments, for example, a previous frame 410 at t−1 and a subsequent frame 430 at t+1 to the frame 420 at the point in time t and are used.

That is, a temporal succession of the three frames 410, 420, and 430 of the reference frame are used to generate the frame 440 of the extrapolated view at the point in time t.

A background in the frames 410, 420, and 430 of the reference view is moved to the right over time. Thus, background data in the frames 410 and 430 of the reference view at the different points in time t−1 and t+1 may be used to compensate for the background hole region 442 in the frame 440 of the extrapolated view.

Further, objects in the frames 410, 420, and 430 of the reference view are moved to the right over time. Thus, background data covered with an object in the frame 420 of the reference view at the point in time t may be obtained using background data in the frames 410 and 430 of the reference view at the different points in time t−1 and t+1. The obtained background data, which was covered, may be used to compensate for the object hole regions 444 and 446 in the frame 440 of the extrapolated view.

That is, the plurality of frames 410, 420, and 430 of the reference view generate an integrated frame of the extrapolated view by temporal frame integration.

The integrated frame may display a larger image than the frames 410, 420, and 430 of the reference view.

For example, in the present embodiments, view extrapolation generates frame information of an outer view according to a spatial direction using a current frame of the reference frame. A lack of the frame information may be found from frames in a temporal direction adjacent to the current frame of the reference view.

Figure 5:
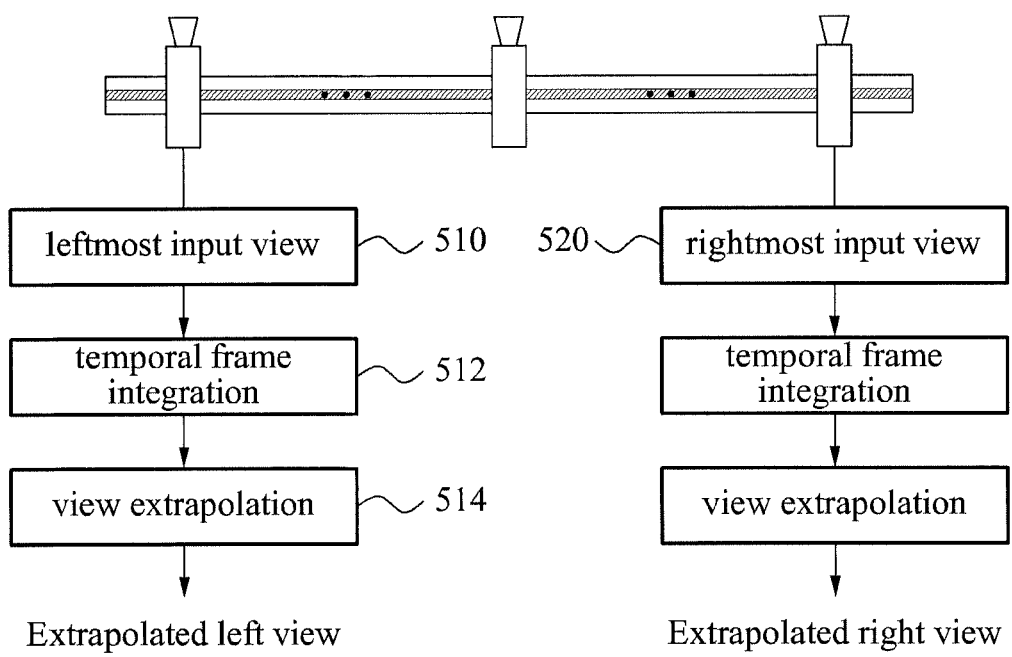
FIG. 5 illustrates a method of generating an extrapolated view according to example embodiments.

FIG. 5 illustrates a method of generating an extrapolated view according to example embodiments.

An extrapolated left view is generated based on a leftmost input view 510.

As described above with reference to FIG. 4, an integrated frame is generated by temporal frame integration 512 integrating a plurality of frames of the leftmost input view 510.

A frame at a virtual point is generated using the integrated frame.

The virtual point is on a left side from a point of the leftmost input view 510, and a plurality of virtual points may be provided.

Each integrated frame is generated with respect to each of the frames of the leftmost input view 510.

Frames at the virtual point are generated with respect to the respective integrated frames successively and chronologically generated, so that view extrapolation 514 is realized. That is, an extrapolated left view is generated by the view extrapolation 514.

A plurality of extrapolated left views may be generated.

Similar to the above process, an extrapolated right view is generated based on a rightmost input view 520. Redundant descriptions are omitted for clarity and conciseness.

Figure 6:
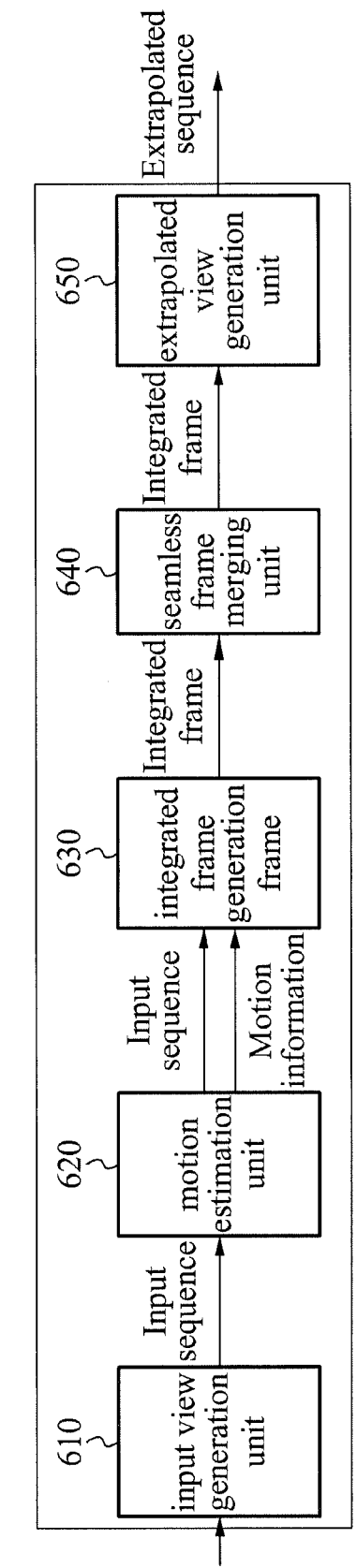
FIG. 6 illustrates a configuration of an image apparatus according to example embodiments.

FIG. 6 illustrates a configuration of an image apparatus according to example embodiments.

The image apparatus 600 includes an input view generation unit 610, an integrated frame generation unit 630, and an extrapolated view generation unit 650.

The image apparatus 600 may further include a motion estimation unit 620 and a seamless frame merging unit 640.

The input view generation unit 610 generates and outputs an input sequence. The input sequence denotes a view at a reference point, described above. The input sequence is formed of a temporal succession of frames.

The frames forming the input sequence are referred to as reference frames. A reference frame (t) denotes a reference frame at a point in time t. Similarly, an integrated frame (t) denotes an integrated frame at the point in time t.

The reference point generally refers to a point of an outermost input view, such as a leftmost input view or a rightmost input view, among a plurality of input views to the image apparatus 600.

The input sequence may include a color sequence representing information about colors of pixels forming a frame and a depth sequence representing information about depths of the pixels.

The motion estimation unit 620 is provided with the input sequence from the input view generation unit 610 and generates chronological motion information about a plurality of frames, the frames generating an integrated frame.

Among the frames of the input sequence, a target frame for motion estimation is the reference frame (t).

The motion information is to detect the same position between the reference frame (t) and an adjacent frame to the reference frame (t) in a temporal direction or a frame previous or subsequent to the reference frame (t), for example, a previous frame (t−1) or a subsequent frame (t+1) to the reference frame (t). When the same position is detected, hole regions in the integrated frame (t) generated using the reference frame (t) are compensated for using information the adjacent frame in the temporal direction.

The motion estimation unit 620 may estimate motion using the color information and the depth information in the input sequence, or estimate whether the current reference frame (t) is moved with respect to the previous reference frame (t−1) or the subsequent reference frame (t+1) by combining the color information and the depth information.

The motion estimation unit 620 may generate a global motion vector of the reference frame (t) as the motion information.

The global motion vector is a vector representing chronological motion of an entire region of a plurality of frames in the input sequence.

The global motion vector represents an extent of motion of the entire current reference frame (t) with respect to the previous reference frame (t−1) or the subsequent reference frame (t+1).

For example, when a camera is moved or panned at a rapid rate while photographing a subject, the entire subject is also moved, and the global motion vector has a great value.

There are various methods of estimating global motion in a frame unit. For example, the motion estimation unit 620 detects a point where a sum of absolute difference (SAD) is minimal in a spatial region to generate a global motion vector. Alternatively, the motion estimation unit 620 may generate a global motion vector using phase correlation in a frequency region.

The following Equation 1 illustrates an example of calculating a global motion vector in a frame unit using an SAD in the spatial region.

$$MV_{global}(i, j) = \underset{x,y}{\mathrm{argmin}}(\alpha \cdot SAD(I^t_{i,j}, I^{t-n}_{i+x,j+y}) + \beta \cdot SAD(D^t_{i,j}, D^{t-n}_{i+x,j+y}))$$

[Equation 1]

In Equation 1, x and y denote a position of a pixel. Due to limited calculation ability, x and y may be limited within a search range of $(-S_x, S_x), (-S_y, S_y)$.

α denotes an SAD weighting with respect to color, and β denotes an SAD weighting with respect to depth.

Since a global vector is calculated, i and j denote an entire frame.

I denotes a color value of an image displayed by a frame. $I^t$ denotes a color value of an image displayed by the current frame (t), and $I^{t-n}$ denotes a color value of an image displayed by a previous frame (t−n) moved by n in the temporal direction from the current frame (t). An SAD($I^t_{i,j}$, $I^{t-n}_{i+x,j+y}$) is a color SAD between the current frame (t) and a frame moved by (x, y) from the previous frame (t−n).

When n is a negative number, an object of comparison is not a previous frame but a subsequent frame.

D is a depth value of an image displayed by a frame. $D^t$ denotes a depth value of the image displayed by the current frame (t), and $D^{t-n}$ denotes a depth value of the image displayed by the previous frame (t−n) moved by n in the temporal direction from the current frame (t). An SAD($D^t_{i,j}$, $D^{t-n}_{i+x,j+y}$) is a depth SAD between the current frame (t) and a frame moved by (x, y) from the previous frame (t−n).

Thus, $MV_{global}(i,j)$ is obtained from x and y which minimize a weighted sum of a color SAD and a depth SAD.

The motion estimation unit 620 may perform motion vector refinement. Refinement of a global motion vector is adding chronological motion information with respect to a local region which does not move according to the global motion vector on the assumption of motion of an image according to the global motion vector.

For example, when a camera is panned while an object in a subject is separately moved, a global motion vector is calculated due to the spanning of the camera, and motion information about a region where the object is positioned is added by motion vector refinement.

The motion estimation unit 620 may generate a local motion vector of the reference frame (t) as the motion information.

The local motion vector is a vector representing chronological motion of a local region of the plurality of frames in the input sequence.

The local motion vector may represent an extent of motion of a local region in the current reference frame (t) with respect to the previous reference frame (t−1) or the subsequent reference frame (t+1).

When an object to be photographed moves with time, only a region where the object is positioned is moved with time. Thus, the local region may be a region where the objects 114 and 116 of FIG. 1 are positioned in a frame.

The local motion vector may be calculated by the above Equation 1, in which i and j denotes a local area of a frame.

The motion vector refinement and the generation of the local motion vector may be selectively performed.

For example, the motion estimation unit 620 may estimate a global motion vector and calculate a difference between pixels of frames based on the calculated motion vector.

When there is only global motion in a frame unit in a sequence of frames, all pixels in a frame move with a global motion vector. Here, the value of the difference between pixels is small.

For example, when the calculated difference is less than or equal to a reference value, the motion estimation unit 620 may perform motion vector refinement based on the estimated global motion vector.

For example, if the calculated difference is greater than or equal to a reference value, the motion estimation unit 620 may determine there is no global motion in a frame unit in the sequence and estimate a local motion vector.

The integrated frame generation unit 630 generates an integrated frame by integrating a plurality of successive frames of the view at the reference point generated by the input view generation unit 610 in the same method as described with reference to FIGS. 4 and 5.

The plurality of frames may include color information and depth information about an image, and the integrated frame may include color information and depth information about an image, for example.

The integrated frame generation unit 630 may generate the integrated frame based on the motion information generated by the motion estimation unit 620.

The integrated frame generation unit 630 receives the input sequence from the input view generation unit 610 or the motion estimation unit 620 and receives the motion information from the motion estimation unit 620. The motion information may be included in the input sequence and transmitted.

The integrated frame generation unit 630 may generate the integrated frame (t) at the point in time t using information about the reference frame (t) at the point in time t, information about a previous or subsequent frame to the reference frame (t), and the motion information.

The integrated frame generation unit 630 may compensate for a frame boundary hole and an object boundary hole in the integrated frame using the information about the reference frame (t) at the point in time t, the information about the previous or subsequent frame to the reference frame (t), and the motion information. An example of compensation will be further described with reference to FIG. 7.

The integrated frame generation unit 630 may separate a background and a foreground in a frame using the depth information.

For example, when the depth information represents a depth image, among pixels forming the depth image, the integrated frame generation unit 630 may determine pixels having a depth value greater than or equal to a predetermined reference value as a foreground that is a region where an object is positioned, and determine pixels having a depth value less than the predetermined reference value as a background.

The integrated frame generation unit 630 may generate an integrated background frame by integrating a plurality of frames of the divided background.

When the reference frame (t) includes a foreground region where the object is positioned, a background of the foreground region is not detected using only information about the reference frame (t).

The integrated frame generation unit 630 may generate an integrated background frame (t) using background information about chronologically adjacent frames to the reference frame (t) and fill the object boundary hole in the integrated frame (t) using the generated integrated background frame (t).

An example of generating an integrated background frame will be further described with reference to FIG. 8.

The seamless frame merging unit 640 receives the integrated frame from the integrated frame generation unit 630 and reduces discordance in a boundary spot in the integrated frame. The seamless frame merging unit 640 outputs the discordance-reduced integrated frame.

In one case, for example, differences may exist between properties of adjacent frames due to changing exposure time of a camera or changing light sources around a subject when the frames are generated.

When temporal frame integration is performed using the adjacent frames, discordance may be recognized visually due to differences between images of the adjacent frames.

Here, when temporal frame integration is performed using the adjacent frames on a time axis, discordance due to differences between images of the adjacent frames may be recognized in the integrated frame.

When an integrated frame is generated using data of frames having different properties, discordance may be recognized visually in a boundary spot where data of different frames are used.

The seamless frame merging unit 640 performs seamless image merging to decrease the discordance.

For example, when a boundary line of images is recognized in a spot where the images of two frames are combined, the seamless frame merging unit 640 blurs the boundary line using a low pass filter. Accordingly, deterioration of image quality in the integrated frame may be reduced.

For example, when frames disaccord with each other due to differences in a color temperature of a light source or in a dynamic range of brightness of a light source, the seamless frame merging unit 640 may change a color temperature of an image of the integrated frame (t) or adjust a contrast of the image of the integrated frame (t) adaptively to characteristics of a reference frame for integration, for example, the reference frame (t). Due to the change or the adjustment, the boundary line may be less recognized.

The extrapolated view generation unit 650 generates an extrapolated view at a virtual point using the integrated frame.

The integrated frame (t) may be a frame resized in the horizontal direction as compared with the reference frame (t). Further, the integrated frame (t) may include a color image and a depth image.

The extrapolated view generation unit 650 may generate a frame (t) of the extrapolated view by repositioning a pixel of the integrated frame (t) using color information and depth information about the integrated frame (t).

The extrapolated view generation unit 650 may generate an image at the virtual point of the extrapolated view through image warping using the integrated frame.

The extrapolated view generation unit 650 may reposition the pixel using a weighting proportionate to a distance between the point of the reference view to the virtual point of the extrapolated view.

The following Equation 2 illustrates an example of generating a view at the virtual point.

$$I_{extrapolated\ view}(x')=I_{reference\ view}(x+\alpha \cdot d)$$ [Equation 2]

Here, $I_{reference\ view}$ is a color value of an image displayed by the integrated frame, and $I_{extrapolated\ view}$ is a color value of an image displayed by the frame of the extrapolated view.

x and x' denote coordinates of a pixel, and d denotes a disparity calculated from a depth value of the image displayed by the integrated frame.

When an object having a predetermined depth is photographed into a plurality of views, pixels corresponding to the object have different relative positions with respect to a background in frames of the views. The extrapolated view generation unit 650 may calculate a disparity between the positions using depth values of the pixels.

α is a weighting value proportionate to the distance.

A pixel is repositioned in the above manner, so that an image is generated. The extrapolated view generation unit 650 may crop the generated image based on an input resolution that is a resolution of a frame of the reference view and generate a final view extrapolated image in which a frame boundary region is compensated for.

The extrapolated view generation unit 650 chronologically and sequentially outputs frames of the generated extrapolated view to generate and to output an extrapolated sequence.

The components of the image apparatus 600 described above, which are the input view generation unit 610, the motion estimation unit 620, the integrated frame generation unit 630, the seamless frame merging unit 640, and the extrapolated view generation unit 650, may be independent hardware devices.

Functions of the above components 610 to 650 may be performed by a single controller (not shown), for example. Here, the controller may be a single processor or a plurality of processors. The components 610 to 650 may be services, processes, threads, or modules performed by the controller. The functions of the above components 610 to 650 may also be performed by a plurality of controllers (not shown) and/or at least one computer (not shown). In addition, the functions of the above components 610 to 650 may be implemented in hardware.

Figure 7:
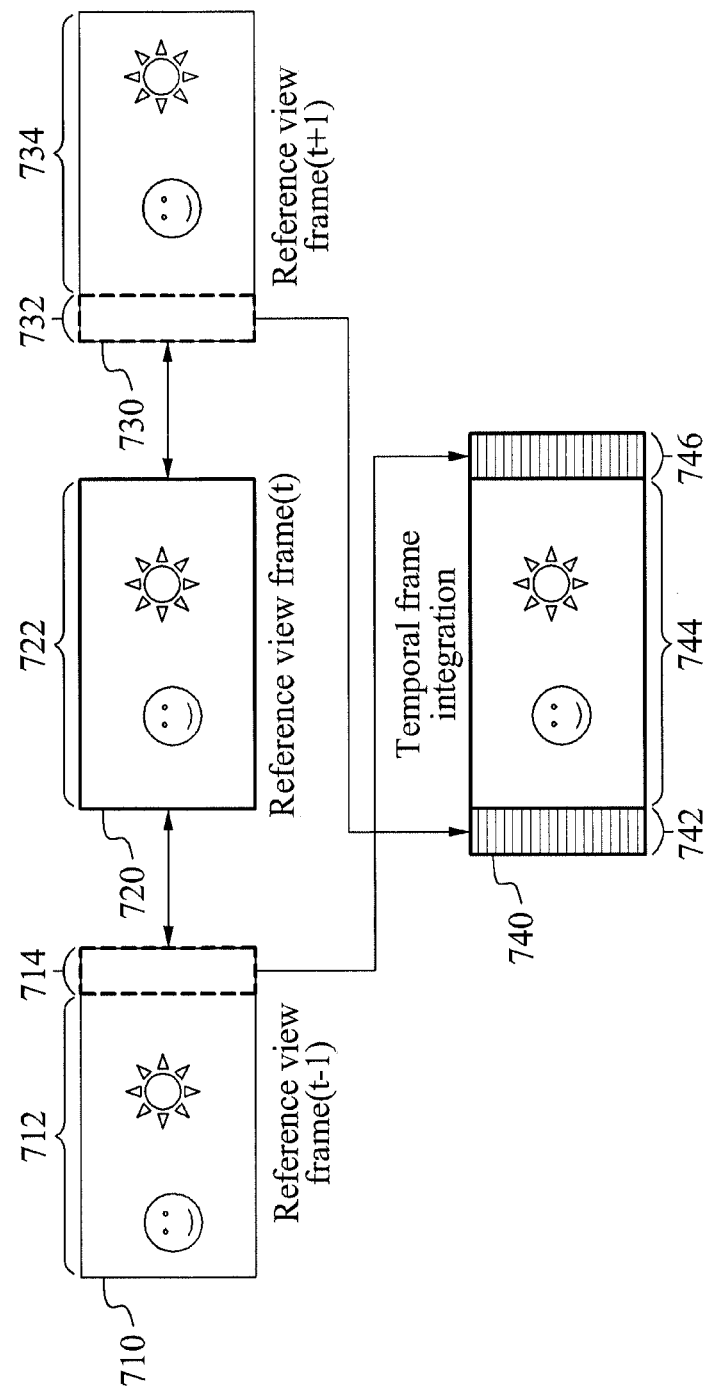
FIG. 7 illustrates a process of compensating for a frame boundary hole and an object boundary hole using motion information according to example embodiments.

FIG. 7 illustrates a process of compensating for a frame boundary hole and an object boundary hole using motion information according to example embodiments.

FIG. 7 shows a current reference view frame (t) 720 at a point in time t, a previous reference view frame (t−1) 710, and a subsequent reference vie frame (t+1) 730.

Objects and backgrounds in the frames 710, 720, and 730 chronologically move to the right. The movement may occur by panning of a camera.

Information about the movement may be provided to the integrated frame generation unit 630 as motion information described above. Alternatively, the integrated frame generation unit 630 may estimate motion in a frame unit using information about the previous reference view frame (t−1) 710 or information about the subsequent reference view frame (t+1) 730.

The integrated frame generation unit 630 may identify a region 712 in the previous reference view frame (t−1) 710 and a region 734 in the subsequent reference view frame (t+1) 730 corresponding to a region 722 in the current reference view frame (t) 720 using the motion information.

Thus, the integrated frame generation unit 630 may identify a right region 714 in the previous reference view frame (t−1) as corresponding to a right side in the current reference view frame 720 and identify a left region 732 in the subsequent reference view frame (t+1) as corresponding to a left side in the current reference view frame 720.

The integrated frame generation unit 630 may dispose all or part of a plurality of frames in an integrated frame based on relative positions of the frames to generate the integrated frame.

For example, the integrated frame generation unit 630 may compensate for an external region of the current reference view frame (t) 720 using information about the region 712 in the previous reference view frame (t−1) 710 and information about the region 734 in the subsequent reference view frame (t+1) 730.

For example, the integrated frame generation unit 630 may dispose an image 722 of the reference view frame (t) 720 in a middle area, the left region 732 in the subsequent reference view frame (t+1) 739 on a left side 742, and the right region 714 in the previous reference view frame (t−1) 710 on a right side 746 to generate an integrated frame 740 by temporal frame integration.

As shown in FIG. 4, when a view is extrapolated in a right direction, a frame boundary hole 442 is generated in a right boundary region.

When frames in an input sequence rotate to the left, shown in FIG. 7, a part 714 of the previous reference view frame (t−1) 710 corresponds to the frame boundary hole 442.

Thus, the integrated frame generation unit 630 may reconstruct a spatially adjacent view image using a previous or subsequent frame on the temporal domain.

Figure 8:
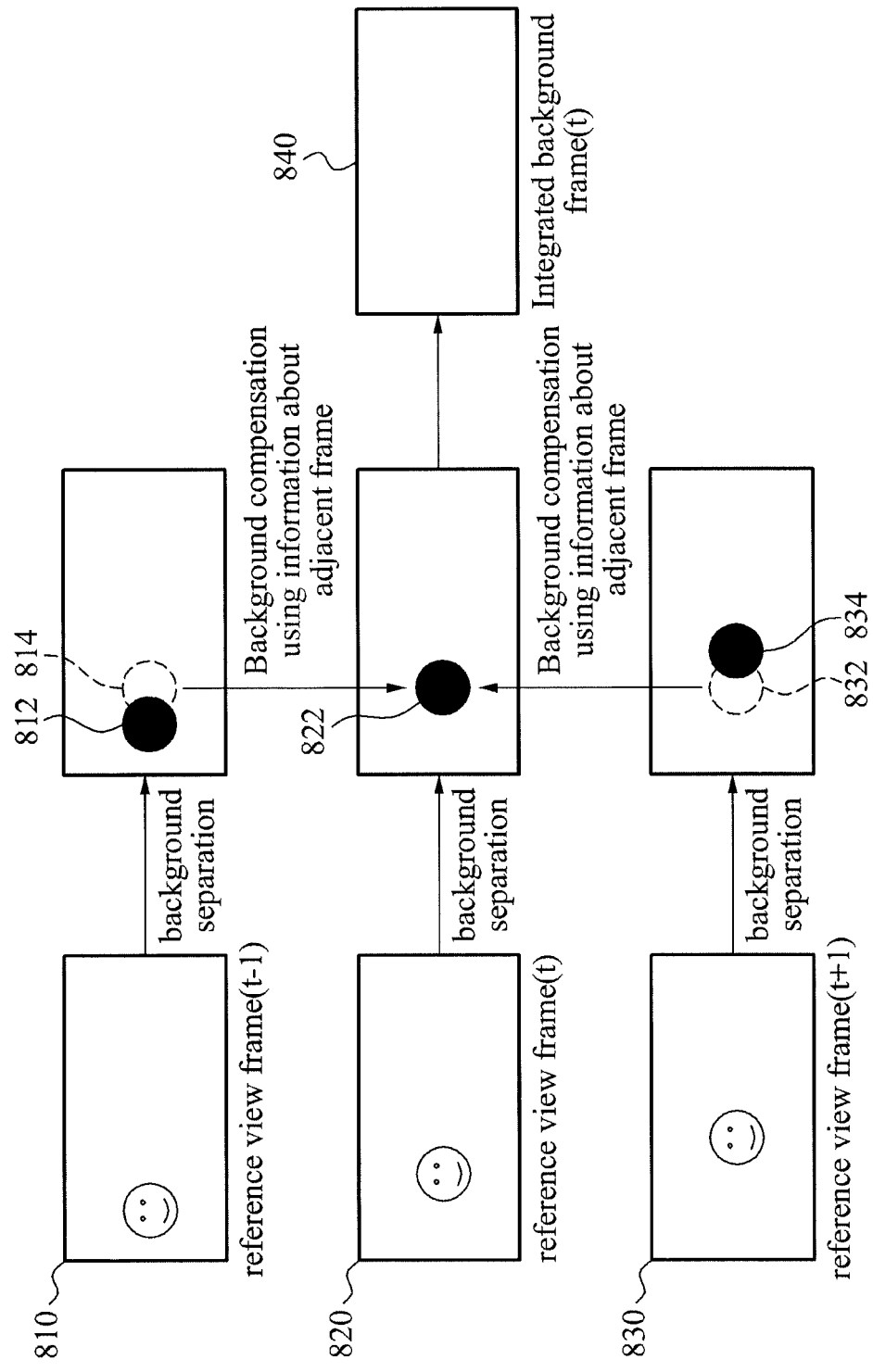
FIG. 8 illustrates a process of generating an integrated background frame according to example embodiments.

FIG. 8 illustrates a process of generating an integrated background frame according to example embodiments.

FIG. 8 shows a current reference view frame (t) 820 at a point in time t, a previous reference view frame (t−1) 810, and a subsequent reference view frame (t+1) 830.

Images displayed in the frames 810, 820, and 830 include a background and an object. The background is fixed in the frames 810, 820, and 830, and the object moves to the right.

Information about the fixing and the movement may be provided to the integrated frame generation unit 630 by motion information described above.

The integrated frame generation unit 630 separates the background in the frames 810, 820, and 830.

The integrated frame generation unit 630 may separate the background using depth information in the frames 810, 820, and 830. For example, among pixels in the frames 810, 820, and 830, the integrated frame generation unit 630 may determine pixels having a depth value greater than or equal to a predetermined value as the background or determine pixels having a depth value less than the predetermined value as the background.

There is a region where the object is positioned in the respective images in the frames 810, 820, and 830. Thus, the separated background has holes 812, 822, and 834 which are not filled with values.

The integrated frame generation unit 630 generates an integrated background frame (t) 840 using the separated background from the current reference view frame (t) 820.

There is the hole 822 which is not filled with values in the background separated from the current reference view frame (t) 820.

The integrated frame generation unit 630 searches for corresponding parts 814 and 834 to the hole 822 in the separated backgrounds from the adjacent frames 810 and 830. The integrated frame generation unit 640 compensates for the hole 822 using the corresponding parts 814 and 834.

The integrated frame generation unit 630 may search for corresponding parts in the images of the frames 810, 820, and 830 using the motion information.

That is, the integrated frame generation unit 630 may compensate for a background spot behind a foreground in the current reference view frame (t) 820 using information about an adjacent frame in the temporal domain. The integrated frame generation unit 630 may compensate for a hole in an object boundary region generated in a view extrapolation process using the integrated background frame.

Figure 9:
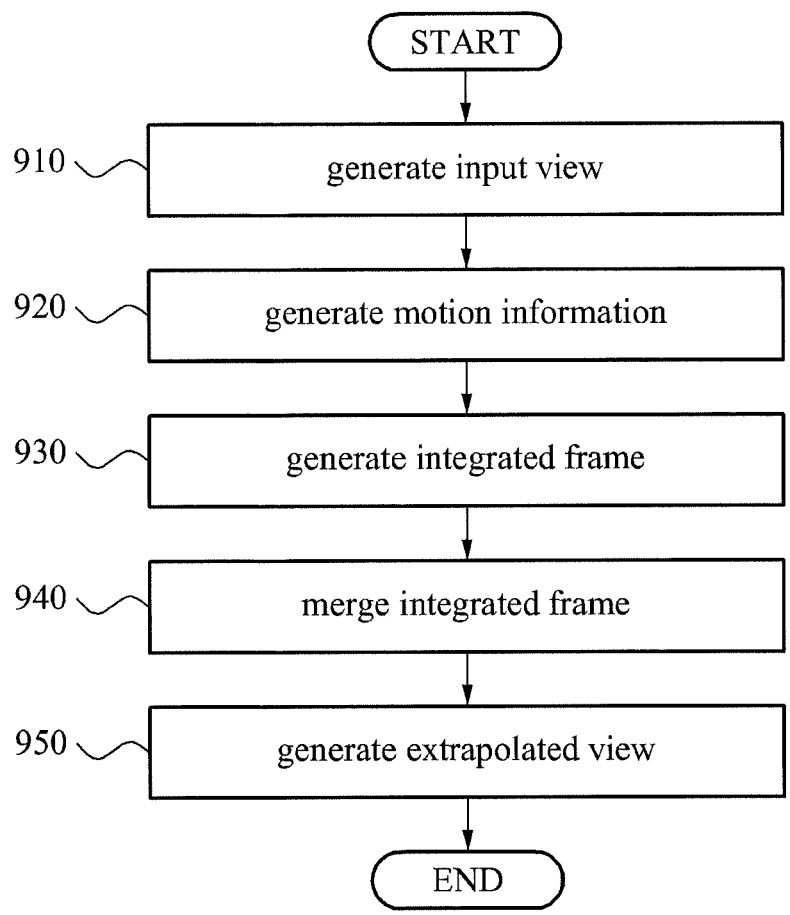
FIG. 9 is a flowchart illustrating a process of generating an extrapolated view according to example embodiments.

FIG. 9 is a flowchart illustrating a process of generating an extrapolated view according to example embodiments.

In operation 910, an input view is generated. The input view outputs a view at a reference point, and the view at the reference point is formed of chronological frames.

In operation 920, chronological motion information about a plurality of successive frames of the view at the reference point is generated.

A method of generating the motion information will be described further with reference to FIG. 10.

In operation 930, the plurality of frames are integrated into an integrated frame. The motion information may be used to generate the integrated frame.

A method of generating the integrated frame will be further described with reference to FIG. 11.

In operation 940, the integrated frame is formed by seamlessly merging the frames so that discordance is reduced in a boundary spot in the integrated frame.

As described above, the discordance occurs due to different properties of frames forming the boundary spot among the plurality of frames.

In operation 950, an extrapolated view at a virtual point is generated using the integrated frame.

The extrapolated view may be generated by repositioning a pixel in the integrated frame using the weighting proportionate to a distance between the reference point and the virtual point, color information about the integrated frame, and depth information about the integrated frame.

The technical content according to the example embodiments described above with reference to FIGS. 1 to 8 may be applied to the present embodiments. Thus, detailed description thereof is omitted.

Figure 10:
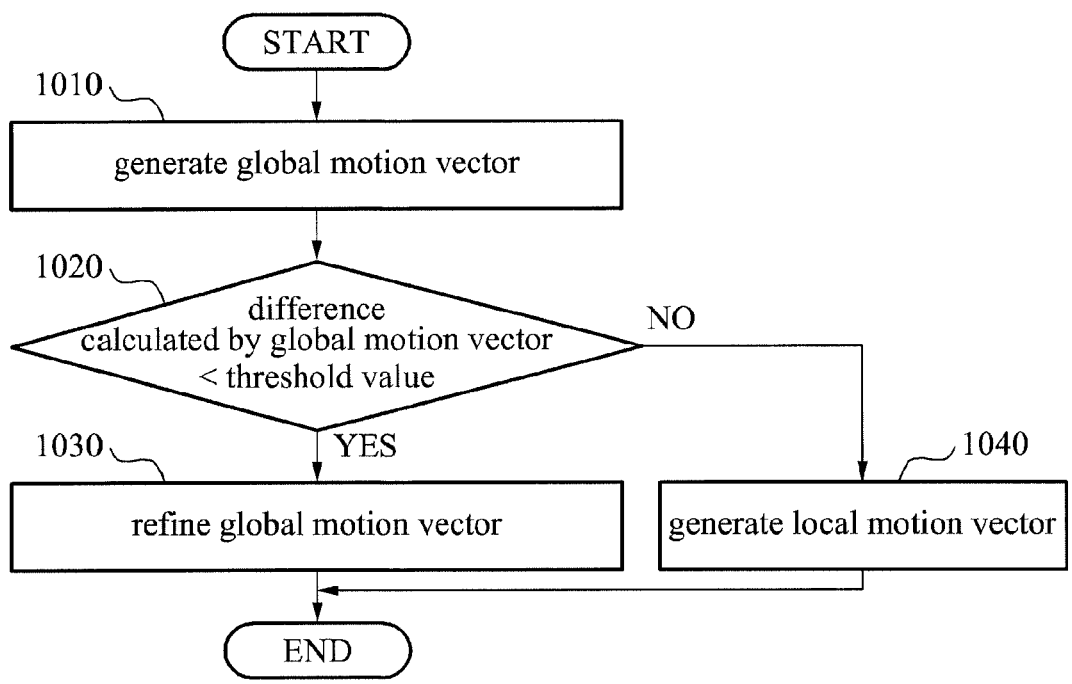
FIG. 10 is a flowchart illustrating a motion estimation process according to example embodiments.

FIG. 10 is a flowchart illustrating a motion estimation process according to example embodiments.

In operation 1010, a chronological global motion vector of a plurality of successive frames of a view at a reference point is generated.

In operation 1020, a difference between pixels of the frames is calculated based on the global motion vector, and the calculated difference is compared with a predetermined threshold value.

When the difference is greater than and equal to the threshold value, operation 1030 is performed. When the difference is less than the threshold value, operation 1040 is performed.

In operation 1030, the generated global motion vector is refined. The refinement is adding chronological motion information with respect to a local region which doesn't move according to the global motion vector on the assumption of motion of an image according to the global motion vector.

In operation 1040, a local motion vector is generated. The local motion vector is a vector representing chronological motion of a local region of the plurality of frames of the view at the reference point.

The technical content according to the example embodiments described above with reference to FIGS. 1 to 9 may be applied to the present embodiments. Thus, detailed description thereof is omitted.

Figure 11:
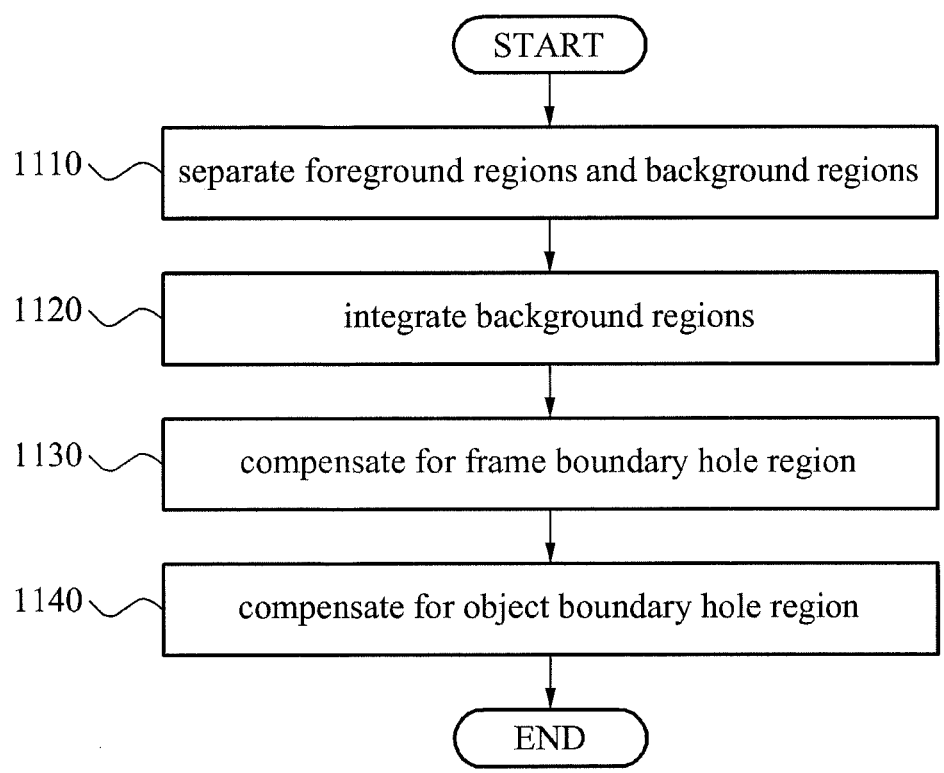
FIG. 11 is a flowchart illustrating a process of generating an integrated frame according to example embodiments.

FIG. 11 is a flowchart illustrating a process of generating an integrated frame according to example embodiments In operation 1110, a foreground region and a background region in a plurality of successive frames of a view at a reference view are separated. Depth information included in the plurality of frames may be used for the separation.

In operation 1120, separated background regions are integrated into an integrated background region resized in the horizontal direction.

In operation 1130, a frame boundary hole region in the integrated frame is compensated for using the integrated background region.

In operation 1140, an object boundary hole region in the integrated frame is compensated for using the integrated background region.

The technical content according to the example embodiments described above with reference to FIGS. 1 to 10 may be applied to the present embodiments. Thus, detailed description thereof is omitted.

An apparatus and a method for generating an extrapolated view according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules.

The methods described herein may be executed on a general purpose computer or processor or may be executed on a particular machine such as an apparatus for generating an extrapolated view described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image apparatus comprising:
    an input view generation unit to output a view at a reference point, the view at the reference point comprising frames generated chronologically;
    an integrated frame generation unit to generate a time-domain integrated frame by integrating a plurality of frames of the output view at the reference point; and
    an extrapolated view generation unit to generate an extrapolated view at a virtual point using the time-domain integrated frame,
    wherein the integration frame generation unit determines pixels having a depth value greater than or equal to a predetermined value of the background or determines pixels having a depth value less than the predetermined value of the background.

2. The image apparatus of claim 1, wherein the image apparatus obtains a plurality of views at a plurality of points, and the input view generation unit outputs a view obtained at an outermost point among the plurality of points.

3. The image apparatus of claim 2, wherein the outermost point is a leftmost point or a rightmost point.

4. The image apparatus of claim 1, further comprising a motion estimation unit to generate motion information about the plurality of frames, wherein the integrated frame generation unit generates the time-domain integrated frame based on the motion information.

5. The image apparatus of claim 4, wherein the motion estimation unit generates a global motion vector based on chronological motion of an entire region of the plurality of successive frames, and the chronological motion information comprises the global motion vector.

6. The image apparatus of claim 5, wherein the motion estimation unit refines the global motion vector based on a chronological change of a local region in the plurality of successive frames.

7. The image apparatus of claim 4, wherein the motion estimation unit generates a local motion vector based on chronological motion of an object region in the plurality of successive frames, and the chronological motion information comprises the local motion vector.

8. The image apparatus of claim 1, further comprising a seamless frame merging unit to decrease discordance in a boundary spot in the time-domain integrated frame, wherein the discordance is generated due to different properties between frames forming the boundary spot among the plurality of successive frames.

9. The image apparatus of claim 1, wherein the integrated frame generation unit generates the time-domain integrated frame by separating foreground regions and background regions of the plurality of successive frames using depth information about the plurality of frames and by integrating the background regions.

10. The image apparatus of claim 9, wherein the integrated frame generation unit compensates for an object boundary hole region using the integrated background regions.

11. The image apparatus of claim 1, wherein the integrated frame generation unit generates the time-domain integrated frame using color information and depth information about the plurality of successive frames, and the time-domain integrated frame is resized in a horizontal direction.

12. The image apparatus of claim 1, wherein the extrapolated view generation unit generates the extrapolated view by repositioning a pixel in the time-domain integrated frame using color information and depth information about the time-domain integrated frame.

13. The image apparatus of claim 12, wherein the extrapolated view generation unit generates the extrapolated view by repositioning the pixel using a weighting proportionate to a distance between the reference point and the virtual point.

14. A method of generating an extrapolated view comprising:
    generating, by a processor, an input view to output a view at a reference point, the view at the reference point comprising frames generated chronologically;
    generating, by the processor, a time-domain integrated frame by integrating a plurality of frames of the output view at the reference point; and
    generating, by the processor, an extrapolated view at a virtual point using the time-domain integrated frame,
    wherein the generating of the time-domain integrated frame comprises determining pixels having a depth value greater than or equal to a predetermined value of the background or determining pixels having a depth value less than the predetermined value of the background.

15. The method of claim 14, further comprising estimating motion to generate motion information about the plurality of frames, wherein the generating of the time-domain integrated frame generates the time-domain integrated frame based on the motion information.

16. The method of claim 15, wherein the estimating of the motion comprises generating a global motion vector based on chronological motion of an entire region of the plurality of successive frames, and the chronological motion information comprises the global motion vector.

17. The method of claim 14, further comprising seamless frame merging to decrease discordance in a boundary spot in the time-domain integrated frame, wherein the discordance is generated due to different properties between frames forming the boundary spot among the plurality of successive frames.

18. The method of claim 14, wherein the generating of the time-domain integrated frame comprises separating foreground regions and background regions of the plurality of successive frames using depth information about the plurality of successive frames and integrating the background regions to generate the integrated background regions resized in a horizontal direction.

19. The method of claim 18, wherein the generating of the time-domain integrated frame further comprises compensating for an object boundary hole region using the integrated background regions.

20. The method of claim 14, wherein the generating of the extrapolated view comprises warping an image by repositioning a pixel in the time-domain integrated frame using a weighting proportionate to a distance between the reference point and the virtual point, color information about the time-domain integrated frame, and depth information about the time-domain integrated frame.

21. A non-transitory computer-readable medium comprising a program for instructing a computer to perform the method of claim 14.

22. An image apparatus comprising:
a controller comprising:
an input view generation unit to output a view at a reference point, the view at the reference point comprising frames generated chronologically;
an integrated frame generation unit to generate a time-domain integrated frame by integrating frames of the output view at the reference point based upon a characteristic of each of the successive frames; and
an extrapolated view generation unit to generate an extrapolated view at a virtual point using the time-domain integrated frame,
wherein the integrated frame generation unit generates the time-domain integrated frame by separating foreground regions and background regions of the plurality of frames using depth information about the plurality of frames and by integrating the background regions, and the integrated frame generation unit compensates for an object boundary hole region using the integrated background regions.

23. The image apparatus of claim 22, wherein the characteristic includes motion information.

24. The image apparatus of claim 22, wherein the characteristic includes background information.

25. The image apparatus of claim 22, wherein the characteristic includes depth information.

26. The image apparatus of claim 22, wherein the characteristic includes color information.

27. A method of generating an extrapolated view comprising:
generating, by a processor, an input view to output a view at a reference point, the view at the reference point comprising frames generated chronologically that are captured by an input device located at the reference point;
generating, by the processor, a time-domain integrated frame by integrating a plurality of successive frames of the output view at the reference point based upon a characteristic of each of the successive frames; and
generating, by the processor, an extrapolated view at a virtual point using the time-domain integrated frame, wherein the generating of the time-domain integrated frame comprises: separating foreground regions and background regions of the plurality of frames using depth information about the plurality of frames and integrating the background regions to generate the integrated background regions resized in a horizontal direction; and compensating for an object boundary hole region using the integrated background regions.

28. The method of claim 27, wherein the characteristic includes motion information.

29. The method of claim 27, wherein the characteristic includes background information.

30. The method of claim 27, wherein the characteristic includes depth information.

31. The method of claim 27, wherein the characteristic includes color information.

* * * * *